United States Patent [19]
Rabe et al.

[11] Patent Number: 5,135,809
[45] Date of Patent: Aug. 4, 1992

[54] METHOD FOR DENSIFICATION OF AMORPHOUS CERAMIC MATERIAL

[75] Inventors: James A. Rabe; Jonathan Lipowitz; Richard E. Jones, all of Midland, Mich.

[73] Assignee: Dow Corning Corporation, Midland, Mich.

[21] Appl. No.: 577,165

[22] Filed: Sep. 27, 1989

Related U.S. Application Data

[62] Division of Ser. No. 120,108, Nov. 13, 1987, Pat. No. 4,921,657.

[51] Int. Cl.$^5$ .............................................. C04B 35/52
[52] U.S. Cl. ........................................ 428/367; 501/92; 501/97; 501/154; 428/364; 428/372; 428/398; 428/446; 428/698; 428/902
[58] Field of Search ............... 428/698, 446, 367, 397, 428/364, 372, 398, 401, 902; 501/92, 97, 154

[56] References Cited

U.S. PATENT DOCUMENTS

| | | | |
|---|---|---|---|
| 3,853,567 | 12/1974 | Verbeek | 106/44 |
| 4,572,902 | 2/1986 | Matano et al. | 501/97 |
| 4,585,704 | 4/1986 | Hirai et al. | 428/446 |
| 4,761,389 | 8/1988 | Rabe et al. | 501/95 |
| 4,861,532 | 8/1989 | Haluska | 501/92 |

FOREIGN PATENT DOCUMENTS 1029517  4/1978  Canada .

OTHER PUBLICATIONS

Legrow. et al., "Ceramics from Hydridopolysilazane" Amer. Ceram. Sok. Bull 66 (2) 363-367 (1987).
Lipowitz et al., "Composition & Structure of Ceramic Fibers Prepared from Polymer Precursors" Adv. Cerm. Materials vol. 2, No. 2, Apr. 1987.
Translation of German Patents Appl. P2236078.7 Verbeek et al. now Patent DG 2,236,078.

*Primary Examiner*—Ellis P. Robinson
*Assistant Examiner*—Archene Turner
*Attorney, Agent, or Firm*—James E. Bittell

[57] ABSTRACT

The elastic modulus and density of an amorphous, ceramic article derived from a resinous organosilicon polymer and having a composition consisting essentially of silicon, nitrogen and/or carbon are increased while substantially maintaining or improving tensile strength by heat treating the ceramic article at an elevated temperature under superatmospheric nitrogen pressure to increase its density while avoiding crystallization. During heat treatment, at least some of the conditions of time, temperature, heating rate, cooling rate, pressure and atmosphere are controlled to minimize erosion of the article which could otherwise occur due to the loss to the surrounding atmosphere, as a gas or gaseous component, of at least one of nitrogen, silicon and carbon. The heat treated, ceramic article is amorphous and non-crystalline and has a density substantially greater than 2.5 g/cc together with desirable values of tensile strength and elastic modulus.

18 Claims, No Drawings

METHOD FOR DENSIFICATION OF AMORPHOUS CERAMIC MATERIAL

This is a divisional of co-pending application Ser. No. 120,108 filed on Nov. 13, 1987 now U.S. Pat. No. 4,921,657.

BACKGROUND OF THE INVENTION

The present invention relates generally to amorphous ceramic materials derived from resinous organosilicon polymers and more particularly to a method for increasing the density and the elastic modulus of those materials, and to the resulting ceramic article.

Ceramic materials of the type in question are typically formed as fibers having a composition consisting essentially of silicon and at least one of nitrogen and carbon. These ceramic fibers are useful, for example, as internal reinforcing elements in composite, high temperature-resistant materials, e.g., materials made into jet engine parts. The ceramic fibers are typically manufactured in a process employing resinous organosilicon polymers as the starting material. The polymer typically contains silicon, hydrogen, nitrogen and carbon, with some oxygen present, usually as an impurity. The polymer may also contain certain additives, such as chlorine and various metallic elements.

The resinous organosilicon polymer is typically processed into a fiber by melting solid polymer and then melt spinning the molten polymer, employing a conventional spinning device called a spinnerette, to form one or more filaments or fibers which are gathered into a fiber tow, and the fiber tow is wound around a spool. A fiber tow is composed of parallel filaments or fibers, e.g. 100-500 filaments in some embodiments. The fiber in the tow is subjected to curing following which the cured fiber is pyrolyzed in an inert atmosphere at relatively high temperatures to produce the ceramic fiber described above.

A more detailed description of a process for forming a ceramic fiber from a resinous organosilicon polymer is contained in an article by LeGrow et al, "Ceramics from Hydridopolysilazane", Am. Ceram. Soc. Bull., 66 [2] 363-67 (1987), and the disclosure thereof is incorporated herein by reference.

Pyrolysis is typically conducted by heating up to a temperature in the range 1000°-1400° C. in an inert atmosphere composed of nitrogen or argon, for example. During pyrolysis, the material undergoes a change in composition, from a resinous organosilicon polymer to a ceramic material, due to a loss of some of the components of the material (principally hydrogen but also some silicon, carbon, nitrogen and oxygen), in the form of gas or vapors. There is also both a weight loss in the article undergoing pyrolysis and a substantial shrinkage of the material (e.g., about 70% by volume), so that the net result is an increase in density as a result of pyrolysis, e.g., from about 1 to about 2.3 g/cc. However, the interior of the material is not as closely packed as is desired, and there is some free volume or voids in the interior, which is undesirable from the standpoint of subsequent events, as will be further explained below. In other words, the ceramic material, as pyrolyzed, has a relatively low density compared to the theoretical value of that characteristic.

The resinous organosilicon polymer starting material is amorphous (i.e. non-crystalline), and the ceramic material produced by pyrolysis is also essentially amorphous.

As noted above, the ceramic material is usually produced in the form of a fiber tow which in turn is used, for example, as an internal reinforcing element in a composite or laminated material. The composite material may have an organic polymer matrix, a metal matrix or a ceramic matrix. In the case of composite materials having a ceramic matrix, they are manufactured and used at elevated temperatures, up to e.g. 1400° C. and above, in a variety of atmospheres including air. For these high temperature applications, it is generally desirable to manufacture the ceramic fibers at temperatures above the intended use temperature. However, when one pyrolyzes the fiber at temperatures above 1400° C. at atmospheric pressure in an atmosphere of nitrogen or argon, there is generally a loss of physical properties, particularly tensile strength, during pyrolysis. While this higher temperature processing is desirable to stabilize the resulting ceramic fiber during its subsequent use, the attendant loss of tensile strength is undesirable. Such a loss of strength occurs because there is internal erosion and surface erosion on the ceramic fiber. Erosion occurs because some of the nitrogen or other components in the ceramic material is driven off as a gas or a component of a gas. The relatively low density of the ceramic material, following pyrolysis, is believed to facilitate the escape of that gas.

Erosion occurs because of the following equilibrium reaction:

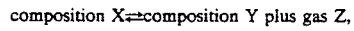
composition X⇌composition Y plus gas Z, wherein gas Z may be nitrogen, carbon monoxide or silicon monoxide, or mixtures of two or more of these gases; composition X is the composition of a ceramic article before it undergoes heating at the elevated temperature; and composition Y is the composition of the article after the loss of gas Z. At atmospheric pressure, temperatures above 1400° C. result in the equilibrium reaction proceeding in the direction of producing composition Y plus gas Z.

As noted above, following pyrolysis, the ceramic material contains silicon and at least one of nitrogen and carbon. In relation to each other, the silicon and nitrogen (and/or carbon) are not present in stoichiometric amounts, but a loss of nitrogen or carbon or silicon in the manner described above brings the relative amounts of silicon and nitrogen (and/or carbon) closer to stoichiometric, in turn increasing the likelihood of crystal formation. Very small crystals are not a problem, but once they have formed, small crystals grow relatively rapidly under the temperature conditions described above, and larger crystals cause decreased strength. Therefore, it is desirable to maintain the amorphous, non-crystalline character of the ceramic material. Further, for many uses, an increased elastic modulus is desirable, along with the material's amorphous character.

Crystalline silicon nitride is often subjected to a sintering operation to increase its density. The process for doing so generally requires the presence of several percent of a metal oxide sintering aid, such as $Y_2O_3$, MgO, $Al_2O_3$ or mixtures thereof, and a sintering temperature of 1900° C. or higher in the presence of superatmospheric nitrogen is generally required. In this connection, see P. Popper "Sintering of Silicon Nitride, A Review", in "Progress In Nitrogen Ceramics", F. L.

Riley, editor, M. Nijnoff Publishers, Boston, 1983, pp. 187-210.

SUMMARY OF THE INVENTION

The purpose of the present invention is to increase the elastic modulus and density of an article, such as a fiber, composed of amorphous, ceramic material consisting essentially of silicon, nitrogen and carbon. Oxygen or hydrogen may also be present, usually as an impurity. The nitrogen and the carbon are not present in stoichiometric amounts relative to the silicon.

A method in accordance with the present invention involves heat treating the ceramic article in a nitrogen atmosphere at an elevated temperature and super atmospheric pressure to increase its density while avoiding crystallization. The heat treating operation is conducted at a temperature below 1800° C., and no metal oxides are required or employed, e.g. as sintering aids.

The heat treating operation is conducted at an elevated temperature above 1400° C. and preferably 1600° C. in an atmosphere of nitrogen. The conditions of time, temperature, heating and cooling rates within the temperature range specified, pressure and atmosphere are controlled to minimize erosion of the ceramic article which could otherwise occur due to the loss to the surrounding atmosphere, as a gas or gaseous component, of at least one of nitrogen, carbon and silicon.

In the equilibrium reaction described above under the sub-heading "Background of the Invention", gas Z may be either nitrogen, carbon monoxide, silicon monoxide or various mixtures thereof. In accordance with the present invention, the partial pressure of nitrogen is controlled so that it equals or exceeds the minimum partial pressure required to drive the equilibrium reaction toward producing composition X at the particular heat treating temperature employed. A partial pressure of nitrogen which is sufficient to produce the desired results described in the previous sentence, not only reduces nitrogen loss, but also has the effect of reducing the loss, to the gaseous atmosphere, of carbon as a component of carbon monoxide and silicon as a component of silicon monoxide.

The result of the heat treating operation is a ceramic fiber having a density substantially greater than 2.5 g/cc, an increased modulus of elasticity and a high proportion of its initial tensile strength, compared to a ceramic fiber not subjected to such a heat treating operation.

Other features and advantages are inherent in the method and article claimed and disclosed or will become apparent to those skilled in the art from the following detailed description.

DETAILED DESCRIPTION

Described below are typical examples of processing conditions employed in a heat treating method in accordance with the present invention.

The heat treatment is conducted at a temperature above 1400° C. for a time period long enough to increase the density of the article substantially above 2.5 g/cc but not long enough to cause crystallization. The maximum heat treating temperature should be no greater than about 1800° C., and preferably it should be no greater than 1600° C.

The time period in a temperature range above 1400° C. is typically in the range 10 seconds to 10 hours. Depending upon the heating and cooling rates at temperatures above 1400° C., it may be possible in accordance with one embodiment of the present invention, to heat to a maximum temperature substantially above 1400° C. (e.g., 1800° C.) but without any substantial hold time at that maximum temperature. In such a case, a time period above 1400° C. long enough to obtain the desired increase in density may be provided by controlling at least one of (a) the heating rate from 1400° C. up to the maximum temperature and (b) the cooling rate down from the maximum temperature.

Generally speaking, the higher the temperature to which the ceramic article is heated, the less hold time required at that temperature and vice versa, although these parameters can also be influenced by the heating rate up to, and the cooling rate down from, the maximum heat treating temperature. Virtually any combination of hold time, temperature and heating and cooling rates can be employed, up to a maximum temperature within the temperature range discussed above, so long as one obtains the desired increase in elastic modulus and density without any significant degree of crystallization or tensile strength loss. Generally speaking, the longer the time spent within the temperature range described above, the greater the likelihood of some crystallization and crystal growth and strength loss, and the time in question includes both hold time at the maximum temperature and heating and cooling time between 1400° C. and the maximum temperature.

The heat treating step is conducted in an atmosphere of nitrogen gas. Unless one takes precautionary steps in accordance with the present invention, erosion of the ceramic material can occur during heating under the temperature and atmospheric conditions described above. This erosion could be in the form of a loss to the surrounding atmosphere, as gaseous nitrogen, gaseous silicon monoxide and/or gaseous carbon monoxide, of nitrogen, silicon and/or carbon from the ceramic material.

Erosion is minimized in accordance with the present invention by employing a partial pressure of nitrogen gas which equals or exceeds the minimum partial pressure required to drive the equilibrium reaction described above toward producing composition X at the heat treating temperature employed. (In this case, composition X would be the composition of the ceramic material before the start of the heat treating step.) The gaseous nitrogen has a pressure of at least two atmospheres and preferably at least seven atmospheres. Typically, fifty atmospheres may be employed, for example. Gaseous nitrogen atmospheres having pressures up to, e.g., 2000 atmospheres can be employed. There is essentially no limit on the upper pressure except for the containment limits of the vessel in which the heat treatment is conducted.

A partial pressure of nitrogen in the range described above not only retards erosion due to nitrogen loss, but also retards erosion due to carbon loss as gaseous carbon monoxide and silicon loss as silicon monoxide.

In accordance with the present invention, the desired properties are attained without employing, during the heat treatment, metal oxides or reactive materials extraneous to the amorphous ceramic material. These desired properties comprise increased density, increased elastic modulus, and an improved retention of tensile strength or even an increase in tensile strength.

The ceramic material subjected to a heat treatment in accordance with the present invention should have at least one, and preferably all, of the properties described below. There should be an absence of macroscopic flow while in the temperature range of the heat treatment, so that the ceramic article will retain its shape during heat treating. There should be an absence, in the composition of the ceramic material, of components which alone or together become molten in the temperature range of the heat treatment. In addition, the ceramic material should remain essentially amorphous throughout the temperature range of the heat treatment.

A heat treating step in accordance with the present invention may be an extension or continuation of pyrolysis, or it may be performed later, separate and apart from pyrolysis. In the latter instance, the ceramic article will have been cooled following pyrolysis and then heated into the temperature range of the heat treatment at some later time.

As noted above, the ceramic material has a composition which results from the pyrolysis of a resinous organosilicon polymer, typical examples of which are hydridopolysilazanes (HPZ) and methylpolydisilylazanes (MPDZ). The MPDZ may be phenylvinyl modified. Additional information on HPZ, its composition, preparation and properties is contained in said LeGrow et al publication identified above under the subheading "Background of the Invention" and in Cannady U.S. Pat. No. 4,540,803 the disclosures of which are incorporated herein by reference. Similar information on MPDZ is contained in Gaul U.S. Pat. No. 4,340,619 the disclosure of which is incorporated herein by reference.

Other resinous organosilicon polymers useful as precursors for forming the ceramic material are identified below together with the patents describing them.

Baney et al. U.S. Pat. No. 4,314,956 (issued Feb. 9, 1982) discloses polysilanes of the general formula $(CH_3Si)((CH_3)_2Si)$ where there is present 0 to 60 mole percent $((CH_3)_2Si)$ units and 40 to 100 mole percent $(CH_3Si)$ units and where the remaining bonds on silicon are attached to silicon and amine radicals of the general formula $-NHR''$ where $R''$ is a hydrogen atom, an alkyl radical of 1 to 4 carbon atoms or a phenyl radical.

Gaul U.S. Pat. No. 4,312,970 (issued Jan. 26, 1982) discloses polysilazane polymers synthesized by reacting various alkyltrichlorosilanes with a disilazane, such as $[(CH_3)_3Si]_2NH$. In this synthesis, $(CH_3)_3SiCl$ is eliminated as a by-product.

Gaul U.S. Pat. No. 4,404,153 (issued Jul. 20, 1982) discloses silazane polymers, which polymers were prepared by reacting chlorine-containing disilanes and disilazanes.

Cannady U.S. Pat. No. 4,543,344 (issued Jul. 3, 1985) and U.S. Pat. No. 4,540,803 (issued Sep. 10, 1985) disclose polymers prepared by reacting $HSiCl_3$ and disilazanes.

Additional relevant polymers are disclosed in Gaul U.S. Pat. No. 4,395,460, issued Jul. 26, 1983; Gaul U.S. Pat. No. 4,404,153, issued Sep. 13, 1983; Haluska U.S. Pat. No. 4,482,689, issued Nov. 13, 1984; Seyferth et al. U.S. Pat. No. 4,397,828, issued Aug. 9, 1983; Seyferth et al. U.S. Pat. No. 4,482,669, issued Nov. 13, 1984; Cannady U.S. Pat. No. 4,535,007, issued Aug. 13, 1985; Winter et al. U.S. Pat. No. 3,892,583, issued Jul. 1, 1975 and Verbeck U.S. Pat. No. 3,853,567, issued Dec. 10, 1974.

The disclosures in the above-identified U.S. Patents are incorporated herein by reference.

Referring again to HPZ and MPDZ-type polymers, when the polymer is a HPZ-type, the ceramic material typically contains the following elements, in approximate wt. %: silicon 59, nitrogen 28, carbon 10 and oxygen 3. When the precursor for the ceramic material is a MPDZ-type polymer, the ceramic material typically contains the following elements, in approximate wt. %: silicon 47, nitrogen 15, carbon 29 and oxygen 9.

As a result of the heat treating or sintering step, there will be only a slight loss of nitrogen, carbon, oxygen and silicon, the intent being to minimize if not totally eliminate such losses. Therefore, following the heat treating step, the ceramic article has essentially the same composition as it had before the heat treating step.

Since no metal oxides (e.g. metal oxide sintering aids) or reactive compositions, extraneous to the ceramic material, were employed in the heat treating step, the ceramic article produced by the heat treating step has a composition reflecting the absence of those materials. As used herein, reference to the absence of metal oxides means metals other than silicon which, of course, is a principal constituent of the ceramic article.

The sintered, ceramic article has an amorphous, non-crystalline structure, similar to that which it had before the heat treating step. The sintered ceramic article also has a density substantially greater than 2.5 g/cc versus a density of about 2.3 g/cc before the heat treating step. Densities of 2.7–2.8 g/cc have been obtained.

Because both internal erosion and surface erosion are minimized during the heat treating step, the ceramic article is substantially devoid of both internal flaws and surface flaws. The absence of surface flaws is especially important because, the closer the flaw is to the surface of the ceramic article, the greater the adverse effect on the strength of the article.

The ceramic article is typically a fiber tow composed of a plurality of ceramic filaments or fibers each having a substantially circular cross section. The filaments preferably have a diameter in the range of about 5 to 25 micrometers.

Examples of heat treatments, and of the properties of ceramic articles produced thereby, are set forth below in Table I. All the heat treatments in Table I were conducted in an atmosphere of gaseous nitrogen at a pressure of 50 atmospheres. The ceramic article was composed of a material derived from a HPZ-type polymer. For all samples in Table I the composition was essentially the same, namely, in wt. %: silicon about 59%; carbon about 10%; nitrogen about 28%; and oxygen about 3%.

TABLE I

| SAMPLE | TIME AT MAX. TEMP., Hours | MAXIMUM TEMPERATURE, °C. | TENSILE STRENGTH, MPa | MODULUS OF ELASTICITY, GPa | DENSITY, g/cc |
|---|---|---|---|---|---|
| A | CONTROL-AS PYROLYZED* | | 883 ± 462 | 123 ± 53 | 2.3 |
| B | 4 | 1400 | 972 ± 296 | 178 ± 28 | 2.48 |
| C | 4 | 1550 | 1138 ± 572 | 194 ± 68 | 2.61 |
| D | 4 | 1800 | WEAK, $SI_3N_4$ CRYSTALS ON SURFACE | | |
| E | CONTROL-AS PYROLYZED** | | 1689 ± 655 | 172 ± 27 | 2.3 |
| F | 4 | 1700 | 1117 ± 427 | 250 ± 50 | 2.72 |
| G | 2 | 1900 | WEAK, $SI_3N_4$ CRYSTALS ON SURFACE | | |

TABLE I-continued

| SAMPLE | TIME AT MAX. TEMP., Hours | MAXIMUM TEMPERATURE, °C. | TENSILE STRENGTH, MPa | MODULUS OF ELASTICITY, GPa | DENSITY, g/cc |
|---|---|---|---|---|---|
| H | 2 | 2140 | WEAK, $Si_3N_4$ CRYSTALS ON SURFACE | | |

*Pyrolysis: 3° C./minute heating rate to about 1200° C. from room temp.; shut off furnace and furnace cool.
**Pyrolysis: 3° C./minute heating rate to about 1100° C. from room temp.; shut off furnace and furnace cool.

Samples A and E are controls reflecting the properties of the pyrolyzed ceramic article before there was any heat treatment step. Samples B, C and D reflect the heat treating of control sample A under various conditions of time and temperature. Samples F, G and H reflect the heat treating of control sample E under various conditions of time and temperature.

Table I shows that holding for 4 hours at temperatures in the range 1400°–1700° C. produces acceptable results for most properties (samples B, C and F), but holding for 4 hours at 1800° C. does not (sample D). Moreover, holding for only 2 hours at 1900° C. or 2140° C. also produces undesirable results (samples G, H). In the case of sample B, holding just at 1400° C. produces a density of about 2.5 g/cc rather than substantially above 2.5 g/cc as does holding at a temperature above 1400° C. (samples C and F). When samples akin to control sample A were heat treated in the range 1400°–1700° C., they underwent not only an increase in density and an increase in modulus of elasticity, but also they underwent an increase in tensile strength (samples B and C). Although a sample akin to control sample E underwent a decrease in tensile strength when heat treated for 4 hours at 1700° C. (sample F), the resulting tensile strength was still acceptable, and there was a substantial increase in both density and modulus of elasticity.

Additional examples of heat treatments, and of the properties of the ceramic articles (fibers) produced thereby, are set forth below in Tables II–IV.

Table II reflects the composition and initial properties of the ceramic fibers. Samples J, K and L are fibers composed of HPZ-derived ceramic material. The full composition of sample L is not given in Table II, but it would be substantially the same as samples J and K.

Table III reflects the heat treating conditions to which the samples were subjected. Furnaces A and B are nitrogen sintering furnaces which operate with a nitrogen atmosphere at a pressure up to 50 atmospheres and a maximum temperature of about 2150° C. Furnace C is a large hot isostatic press (HIP) furnace having a temperature capability of about 2000° C. and a pressure capability up to about 2000 atmospheres. The cooling procedure comprised shutting off the furnace and allowing the samples to furnace cool, typically at a cooling rate of 10°–30° C./min. for the first 200°–300° C. of cooling, and then at gradually decreasing rates.

For furnaces A and B, the heating rate was about 50° C./min., and the average cooling rate was about 70° C./min., with a higher cooling rate of about 100°–150° C./min. at the start of cooling. For furnace C, the heating rate was about 7.5° C./min., and the cooling rate was about 17° C./min.

Table IV summarizes compositions and properties after the heat treatment, to the extent that they were determined or available.

In Tables II and IV, the values for tensile strength, modulus of elasticity and diameter are average values for a sampling of 7 to 29 filaments. Each filament was broken in tension using a one inch gage length. The tensile strength and elastic modulus values were obtained according to the procedures of ASTM test method D-3379-75.

TABLE II

| SAMPLE | WT. % | | | | | DENSITY, g/cc | INITIAL PROPERTIES TENSILE STRENGTH, MPa | MODULUS OF ELASTICITY, GPa | DIAMETER, μm | NUMBER OF TESTS |
|---|---|---|---|---|---|---|---|---|---|---|
| | Si | C | N | O | H | | | | | |
| J | 57.0 | 9.85 | 28.4 | 2.70 | 0.07 | 2.34 | 1820 | 173 | 11.5 | 20 |
| K | 57.5 | 9.59 | 29.1 | 2.06 | 0.15 | 2.3 | 1717 | 184 | 11.3 | 29 |
| L | | | | 3.54 | | 2.39 | 2337 | 183 | 13.1 | 12 |

TABLE III

| | HEAT TREATMENT | | | | |
|---|---|---|---|---|---|
| SAMPLE | INITIAL TEMPERATURE, °C. | MAXIMUM TEMPERATURE, °C. | HOLD TIME AT MAX. TEMP., hrs. | $N_2$ PRESSURE, atmospheres | FURNACE |
| J-1 | 25 | 1700 | 4 | 50 | A |
| J-2 | 25 | 1700 | 4 | 50 | B |
| J-3 | 25 | 1700 | 2 | 50 | B |
| J-4 | 25 | 1700 | 0.5 | 50 | A |
| K-1 | 25 | 1700 | 0.5 | 50 | A |
| K-2 | 25 | 1650 | 0.5 | 50 | A |
| K-3 | 25 | 1600 | 0.5 | 50 | A |
| K-4 | 25 | 1600 | 0 | 50 | A |
| K-5 | 25 | 1600 | 0.5 | 25 | A |
| K-6 | 25 | 1600 | 0.5 | 7 | A |
| L-1 | 25 | 1700 | 1 | 50 | C |
| L-2 | 25 | 1950 | 1 | 1980 | C |

TABLE IV

| | | AFTER HEAT TREATMENT | | | | | | | | |
|---|---|---|---|---|---|---|---|---|---|---|
| SAMPLE | CHANGE IN WEIGHT % | WT. % | | | | | DENSITY, g/cc | TENSILE STRENGTH, MPa | MODULUS OF ELASTICITY, GPa | DIAMETER, μm | NUMBER OF TESTS |
| | | Si | C | N | O | H | | | | | |
| J-1 | +3.53 | | | 2.2 | | | 2.80–2.93 | 1579 | 233 | 11.1 | 24 |
| J-2 | −1.54 | | | | | | Caked with white powder (silicon nitride) | | | | |
| J-3 | +2.03 | — | — | — | — | — | Caked with white powder (silicon nitride) | | | | |
| J-4 | −0.65 | | | 2.3 | | | 2.73–2.83 | 1372 | 224 | 11.1 | 23 |
| K-1 | −0.64 | | | | | | 2.71–2.83 | 965 | 259 | 10.6 | 10 |
| K-2 | −1.47 | | | | | | 2.80–2.94 | 910 | 280 | 11.2 | 9 |
| K-3 | −0.52 | | 9.83 | 29.5 | 1.90 | 0.02 | 2.45–2.66 | 1903 | 241 | 10.9 | 12 |
| K-4 | −0.68 | | | | | | 2.71–2.83 | 1765 | 265 | 10.5 | 7 |
| K-5 | −0.74 | | | | | | 2.68 | 2096 | 310 | 10.2 | 8 |
| K-6 | −0.81 | | | | | | 2.68 | 2448 | 290* | 10.1 | 8 |
| L-1 | +4.6 53.1 7.91 | | 36.1 | | 0.49 | 0.11 | Too weak to test (some white powder) | | | | |
| L-2 | +4.1 54.2 7.64 | | 35.4 | | 0.52 | 0.09 | >2.68 | Too weak to test (microscopic crystals) | | | |

*Independent testing by different method found 845 GPa

A heat treatment comprising heating up to 1600° C. at 50 atmospheres N₂ with no hold time (sample K-4) produced as much densification and elastic modulus improvement as a 0.5-hour exposure to the same pressure and maximum temperature conditions (K-3). This shows that a hold at maximum temperature is not necessary to provide a substantial increase in density and modulus of elasticity.

Some unidentified furnace characteristic affected the product. Furnace B consistently gave unusable products after heat treatment (e.g., J-2 and J3), under heat-treating conditions apparently similar to those which gave good results in Furnace A (J-1).

Furnace A was rebuilt not long after the (J) series of tests, and then produced results similar to Furnace B for heat treatment at 1700° C./50 atm. N₂ (weak fibers caked with white powder). The K series demonstrated that this problem could be corrected by reducing temperature. The sample heat treated at 0.5 hrs/1650° C./50 atm. N₂ (K-2) was still weak after heat treatment, but had much less white powder, and the sample heat treated at 0.5 hrs/1600° C./50 atm. N₂ (K-3) was clean and showed no strength loss at all. Substantial densification and modulus increase was still obtained for K-3 despite the lower temperature. Eliminating the hold time (K-4) while retaining the other conditions of K-3 produced results at least equally as good as the K-3 results.

All of samples K-3 through K-6 were heat treated in accordance with preferred embodiments of the present invention (1600° C. max./7-50 atmospheres N₂/0-0.5 hr. hold). All had tensile strengths exceeding 1600 MPa, an average density exceeding 2.5 g/cc and an elastic modulus exceeding 210 GPa. Sample K-4 (50 atmospheres and no hold) had a density exceeding 2.7 g/cc.

Heat treatment at 1 hr/1700° C./50 atm. N₂ in furnace C (L-1) gave weak, caked fibers. X-ray analysis of L-1 showed 62% alpha-silicon nitride crystals and 21% beta-silicon nitride crystals.

Sample L-2 shows that even a pressure of 1980 atm. N₂ is insufficient to prevent degradation when holding for 1 hour at 1950° C. This temperature appears to be beyond the useful range except perhaps with very rapid heating rates and no hold at that temperature.

The data set forth above in Tables I–IV indicates that densification without an undesirable amount of erosion or crystallization can be obtained when heat treating ceramic articles derived from a resinous organosilicon polymer, by controlling at least some of the conditions of time, temperature, heating rate, cooling rate, pressure and atmosphere. A temperature above 1400° C. is essential, and one must provide a minimum partial pressure of nitrogen as previously described. Given the parameters described in the previous sentence, one can then adjust the other conditions (e.g., hold time, maximum temperature, heating rate) to optimize the avoidance of erosion and crystallization. Oxides and reactive materials, solid or gaseous, extraneous to the ceramic article are avoided, as are maximum temperatures greater than about 1800° C.

The foregoing detailed description has been given for clearness of understanding only, and no unnecessary limitations should be understood therefrom, as modification will be obvious to those skilled in the art.

We claim:

1. A ceramic fiber derived from a resinous organosilicon polymer, the fiber having:
   a composition consisting essentially of silicon, nitrogen and carbon;
   an amorphous, non-crystalline structure; and a density greater than 2.5 g/cc.

2. A ceramic fiber as recited in claim 1 wherein the fiber has an elastic modulus of at least 210 GPa and a tensile strength of at least 1600 MPa.

3. A ceramic fiber as recited in claim 1 wherein the fiber is substantially devoid of metal oxide sintering aids.

4. A ceramic fiber as recited in claim 2 wherein the fiber is substantially devoid of metal oxide sintering aids.

5. A ceramic fiber as recited in claim 1 wherein the density is greater than 2.7 g/cc.

6. A ceramic fiber as recited in claim 2 wherein the density is greater than 2.7 g/cc.

7. A ceramic fiber as recited in claim 3 wherein the density is greater than 2.7 g/cc.

8. A ceramic fiber as recited in claim 4 wherein the density is greater than 2.7 g/cc.

9. A ceramic fiber as recited in claim 1 wherein the fiber also contains oxygen.

10. A ceramic fiber tow composed of a plurality of filaments each having a substantially circular cross section, said filaments each having a diameter in the range of about 5 to 25 micrometers;
   a composition consisting essentially of silicon, nitrogen and carbon;
   an amorphous, non-crystalline structure; and a density greater than 2.5 g/cc.

11. A ceramic fiber tow as recited in claim 10 wherein each filament has an elastic modulus of at least 210 GPa and a tensile strength of at least 1600 MPa.

12. A ceramic fiber tow as recited in claim 10 wherein each filament is substantially devoid of metal oxide sintering aids.

13. A ceramic fiber tow as recited in claim 11 wherein each filament is substantially devoid of metal oxide sintering aids.

14. A ceramic fiber tow as recited in claim 10 wherein each filament has a density greater than 2.7 g/cc.

15. A ceramic fiber tow as recited in claim 11 wherein each filament has a density greater than 2.7 g/cc.

16. A ceramic fiber tow as recited in claim 12 wherein each filament has a density greater than 2.7 g/cc.

17. A ceramic fiber tow as recited in claim 13 wherein each filament has a density greater than 2.7 g/cc.

18. A ceramic fiber tow as recited in claim 10 wherein each filament also contains oxygen.

* * * * *